United States Patent
Bouyoucos et al.

(10) Patent No.: US 6,181,646 B1
(45) Date of Patent: Jan. 30, 2001

(54) GEOPHYSICAL EXPLORATION SYSTEM USING SEISMIC VIBRATOR SOURCE WHICH PROVIDES A COMPOSITE SWEEP

(75) Inventors: John V. Bouyoucos, Rochester; David P. Hollinger, Avon, both of NY (US)

(73) Assignee: Hyroacoustics, Inc., Rochester, NY (US)

( * ) Notice: Under 35 U.S.C. 154(b), the term of this patent shall be extended for 0 days.

(21) Appl. No.: 09/331,472
(22) PCT Filed: Oct. 22, 1997
(86) PCT No.: PCT/US97/19248
 § 371 Date: Jun. 21, 1999
 § 102(e) Date: Jun. 21, 1999
(87) PCT Pub. No.: WO98/53344
 PCT Pub. Date: Nov. 26, 1998

Related U.S. Application Data
(60) Provisional application No. 60/034,565, filed on Jan. 7, 1997.

(51) Int. Cl.[7] .................................................... G01V 1/143
(52) U.S. Cl. ............................................................ 367/189
(58) Field of Search ........................ 367/189, 49; 181/113

(56) References Cited

U.S. PATENT DOCUMENTS

| | | |
|---|---|---|
| 4,004,267 | 1/1977 | Mayne . |
| 4,295,213 | 10/1981 | Mifsud ................................ 367/189 |
| 4,339,810 | 7/1982 | Nicholas et al. ..................... 367/49 |
| 4,458,339 | 7/1984 | Wason ................................. 367/49 |
| 4,823,326 | 4/1989 | Ward ................................... 367/41 |

Primary Examiner—Daniel I. Pihulic
(74) Attorney, Agent, or Firm—M. LuKacher

(57) ABSTRACT

A system for geophysical exploration uses a single source (30) which emits signals over multiple octaves. The source is driven by a composite sweep signal having two or more sweeps, one of which covers the lower octave (10) while the other sweeps cover the remainder of the bandwidth. The signals covering the lower portion are reduced in the case of a sweep which varies linearly with time in proportion to the square root of the ratio of the sweep rate of the signals covering the upper end to the sweep rate of the signals covering the lower end. The signals are transmitted simultaneously. Because of the composite sweep the same energy spectrum is transmitted as with a sine wave sweep which extends over the entire frequency band, while reducing the peak power and radiator displacement required at lower frequencies to maintain a flat spectrum. The size of the equipment can be reduced.

8 Claims, 6 Drawing Sheets

Figure 1:
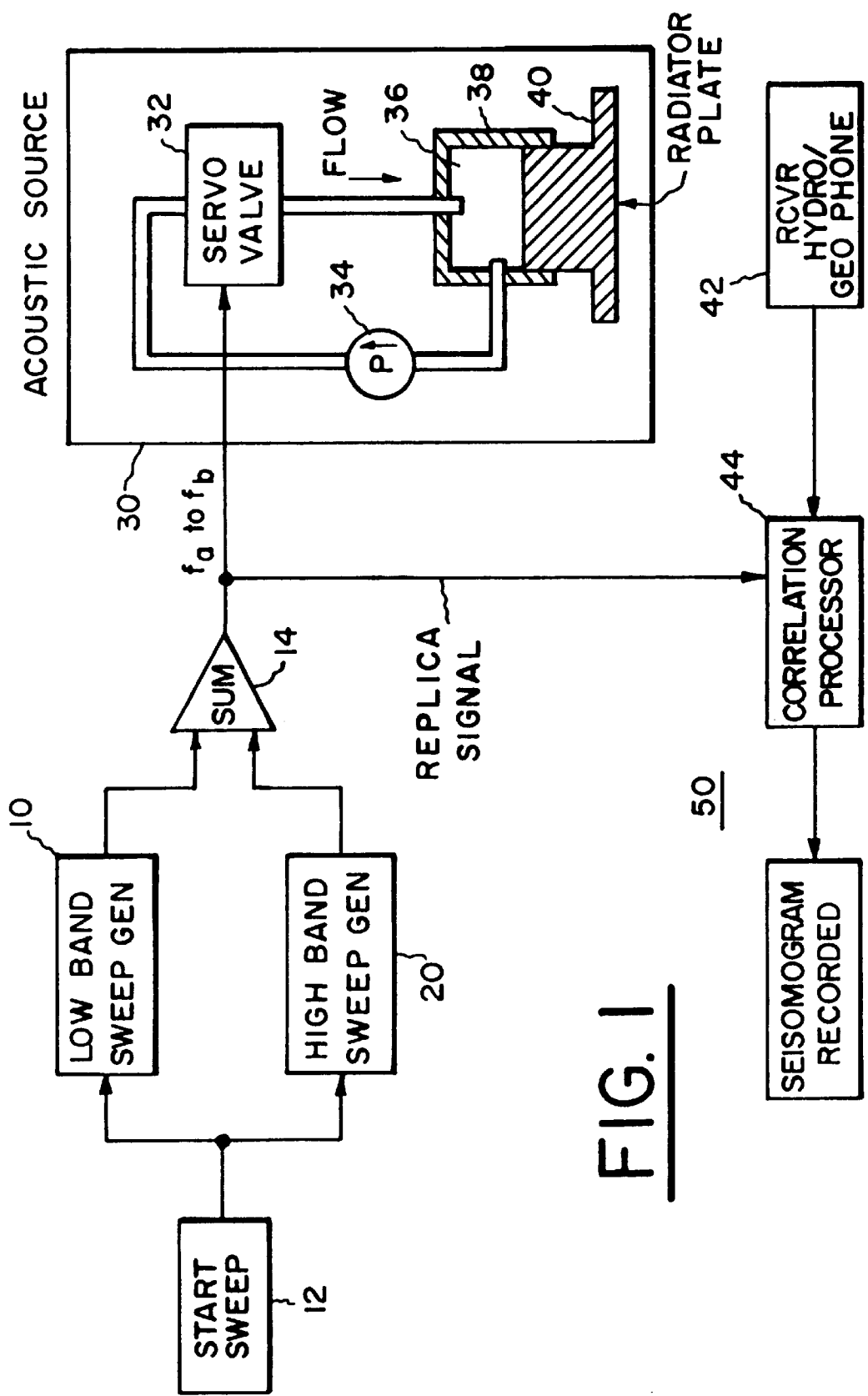

GEOPHYSICAL EXPLORATION SYSTEM USING SEISMIC VIBRATOR SOURCE WHICH PROVIDES A COMPOSITE SWEEP

This application claims the priority Application No. 60/034,565 filed Jan. 7, 1997.

DESCRIPTION

The present invention relates to a geophysical exploration system having a seismic source which provides a composite sweep over a multi-octave frequency band. A composite sweep, as provided in accordance with the invention, is a FM sweep of sinusoidal or continuous wave (CW) signals which sweep over different portions of the frequency band during the same interval of time. The system provided by the invention may be used in marine environments or on land and is capable of producing acoustic transmissions of sufficient power into an earthen strata to detail the geophysical properties of the strata to a desired depth, usually for seeking evidence of petroleum reservoirs.

Acoustic transmissions for geophysical exploration are generally provided by an FM sweep of frequencies over a frequency band extending from a low frequency and covering a bandwidth of typically 3 to 6 octaves. The sweep may have a duration of the order of 10 seconds (e.g. from 5 to 20 seconds) and is usually repeated as the platform which moves over the land or the boat deploying the acoustic transmitting system progresses along a survey line. Acoustic reflections from the earthen strata are received by a hydrophone in the case of marine environments or a geophone in the case of land surveys. An array of such hydrophones or geophones may be used. The signal is recorded and analyzed as by means of correlation processing and seismograms depicting the earthen strata are generated. The low frequencies in the transmission are important for deep penetration of the acoustic waves in the earth, while the high frequencies are important for resolution of the interfaces between strata having different signal propagation characteristics.

Seismic vibrator sources have been proposed which use different sources for different portions of the bandwidth. See Mifsud, U.S. Pat. No. 4,295,213 issued Oct. 13, 1981 and Ward, U.S. Pat. No. 4,823,326 issued Apr. 18, 1989. It has also been proposed to transmit different portions of the frequency band successively in successive time increments. See Mayne, U.S. Pat. No. 4,004,267 issued Jan. 18. 1977. It has also been proposed, in order to reduce the sweep time from the time required for discrete sweep signals which have been transmitted successively, to transmit those signals at the same time as a combined signal. However, in no case are the amplitudes of the signals adjusted in order to provide a flat spectrum of transmitted energy, that is, to create a constant amplitude acoustic pressure or spectral level. Moreover, each spectral portion has been processed separately and not as a composite signal extending over the entire frequency band.

Where a sweep has extended over a large frequency band and is generated in a single source or where separate sources have been used for the low frequencies, such sources have incorporated large radiating pistons (radiators) which can vibrate over large strokes. To maintain a constant acoustic energy flux density over the sweep, the ability for the source to handle large, physical amplitudes of motion, to cover the low frequencies of the band, has been required. More power is also needed to drive the vibrator at low frequencies and high stroke levels, which, in the case of hydraulically driven vibrator sources, requires large pumps in order to handle the flow to support the large strokes.

It is the principal object of the present invention to provide an improved geophysical exploration system and particularly to improve such system by improving the seismic vibrator source therein so that a composite sweep can be transmitted with generally the same energy spectrum (a generally constant spectrum) over the entire frequency band of multiple octaves while significantly reducing the peak power (and flow demand in case of hydraulic sources) and the size of equipment associated with the sources.

The invention provides a vibrator source having a composite sweep that enables the minimization of source size and radiator stroke for a given sweep frequency range and acoustic source level requirement. In a system embodying the invention, the spectral energy density is made essentially constant by utilizing different amplitudes for the lower and higher frequency sweeps which sweep at different rates (rate of change of frequency) over the same time interval to provide the composite sweep.

Specifically, the amplitude of the sweep which covers the lower, (approximately the first octave) of the bandwidth is reduced with respect to the amplitude of the sweep extending above the first octave, in proportion to the square root of the ratio of the sweep rate of the higher frequency sweep to the sweep rate of the lower frequency sweep. In other words, since the sweep periods are equal, the lower frequency sweep amplitude is reduced by the square root of the bandwidth of the upper frequency sweep to the ratio of the bandwidth of the lower frequency sweep.

It will be understood that the sweeps which cover the lower and upper frequency portions of the band can change frequency in the same direction, say upwardly or downwardly or one sweep can change in frequency upwardly while the other changes downwardly. In all cases, a composite sweep signal is generated and transmitted by the seismic vibrator.

Consider for example the generation of a composite sweep in accordance with the invention extending from 5 Hz to 200 Hz. This frequency band is divided into two sweep components which run concurrently. In this example, the first sweep component covers the lowest octave, 5 to 10 Hz and the second sweep component covers the remaining range of the bandwidth from 10 Hz to 200 Hz. Now if both sweeps are linear and extend over a typical time duration of 10 seconds, the rate of the sweep for the first sweep component is 5 Hz/10 SEC or ½ Hz per second while the rate of the second sweep component is 190 Hz /10 SEC or 19 Hz per second. Since the spectral energy density transmitted by the vibrator is proportional to the square of the acoustic pressure per unit frequency ($P^2$/Hz ), different sweep rates require different acoustic pressure levels to achieve the same spectral level of interest. For a flat spectrum (essential constant) the sweep component from 5 to 10 Hz must have a an acoustic level reduced by the square root of the ratio of the second sweep bandwidth to the first sweep bandwidth or the square root of 190/5 (or 16 dB) relative to the amplitude of the sweep component extending from 10 to 200 Hz. For an equivalent spectral level, a single linear sweep from 5 to 200 Hz would therefore require a spectral amplitude approximately 16 dB higher in the 5 to 10 Hz band than the composite sweep case.

Since the radiation displacement growth over the octave from 10 Hz to 5 Hz , for constant acceleration, is 12 dB, the 16 dB reduction achieved by the above exemplary composite sweep format enables the 5 to 10 Hz sweep to require an amplitude less than the amplitude required at the 10 Hz end of the 10 to 200 Hz sweep. Accordingly, the composite sweep enables a significant reduction in the maximum stroke required by the vibrator source, thereby significantly reducing its size, weight and input power demands, while maintaining a constant spectral level at the low end of the desired frequency spectrum. The composite sweeps are not limited to two components nor do any of the components have to extend over a certain frequency range (such as an octave). The invention provides a composite set of sweeps which provide a spectral energy level of interest while enabling source size displacement amplitudes and power supply, (for example, pump and flow requirements) to be minimized.

The foregoing and other objects, features and advantages of the invention will become more apparent from a reading of the following description in connection with the accompanying drawings.

FIG. 1 is a schematic diagram illustrating a geophysical exploration system having a broadband acoustic signal projector or vibrator driven by a composite signal and a receiving channel which processes the composite signal upon reflection from earth and strata to produce seismograms, all in accordance with the-present invention.

Figure 2:
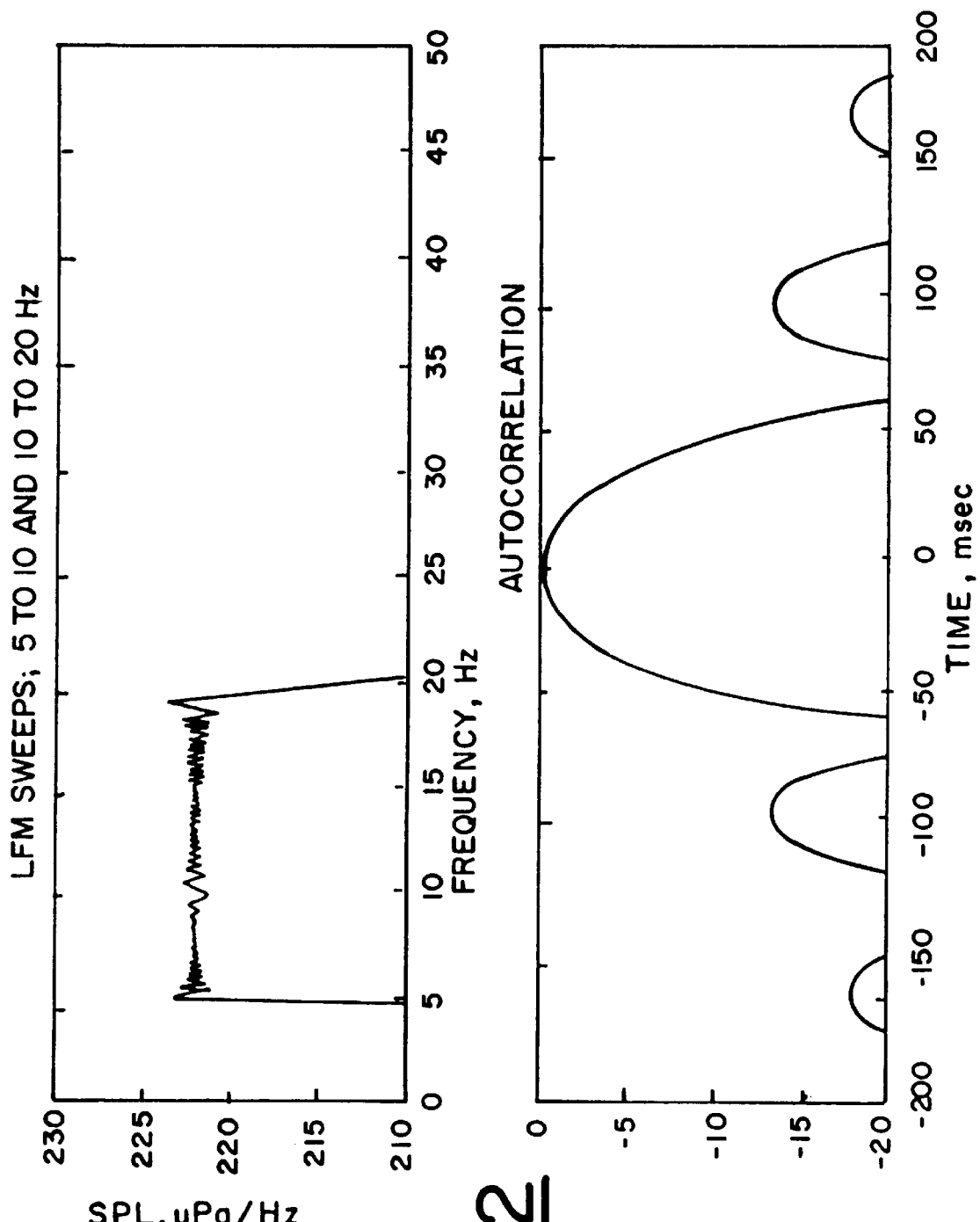

FIG. 2 includes a plot of the spectral level of the composite sweep in the water surrounding the radiator of the vibrator source and which are projected from that radiator in terms of micro Pascals per Hertz (uPa/Hz), and an autocorrelation function which is obtained by correlation processing of the composite signal.

Figure 3:
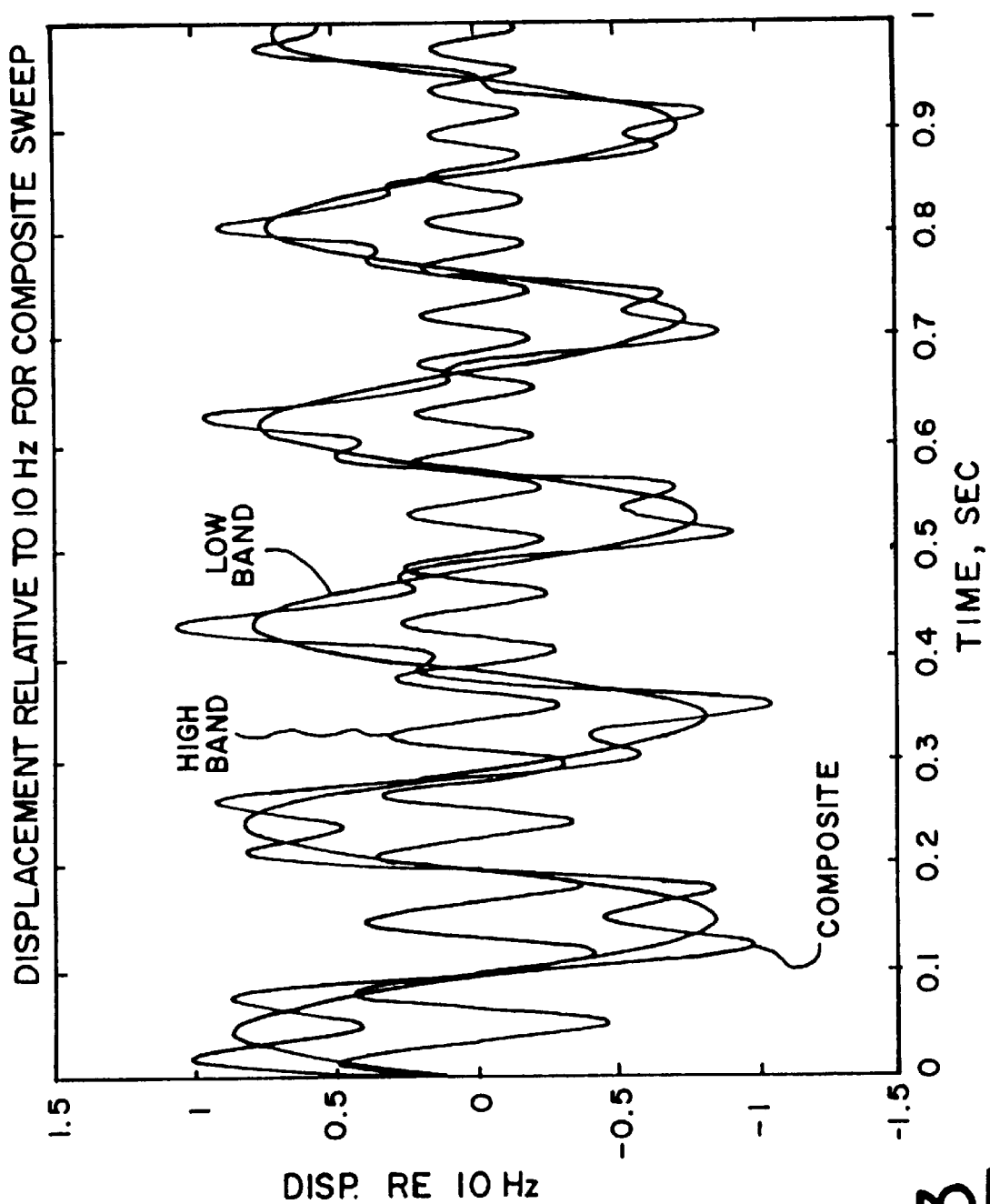

FIG. 3 is a plot of relative radiator displacements for three components of a composite sweep where the low band sweep extends from 5 to 14 Hz and the high band sweep from 14 to 200 Hz. The plot shows the relative radiator displacement due to the low band sweep component, the high band sweep component and the composite sweep. (Displacements are relative to that required for a 10 Hz tone at the same sound pressure level.) The figure illustrates the initial 1 second portion of the composite sweep that extends for 16 seconds and shows the relative radiator displacement for a given sound pressure level, which is proportional to the radiator acceleration. For this composite sweep the low band sound pressure level is the square root of $((14-5)/(200-14))$ or approximately 22% of the high band sound pressure level. Since the sound pressure level is proportional to the second derivative of the displacement, the radiator displacement at 5 Hz would be 784% of the displacement at 14 Hz for the same sound pressure level. The composite sweep allows the low frequency displacement to be reduced by 0.22*7.84 or the 5 Hz displacement is 1.72 times the 14 Hz displacement. When the two sweeps are then summed, the relative peak composite displacement is approximately 1.

Figure 4:
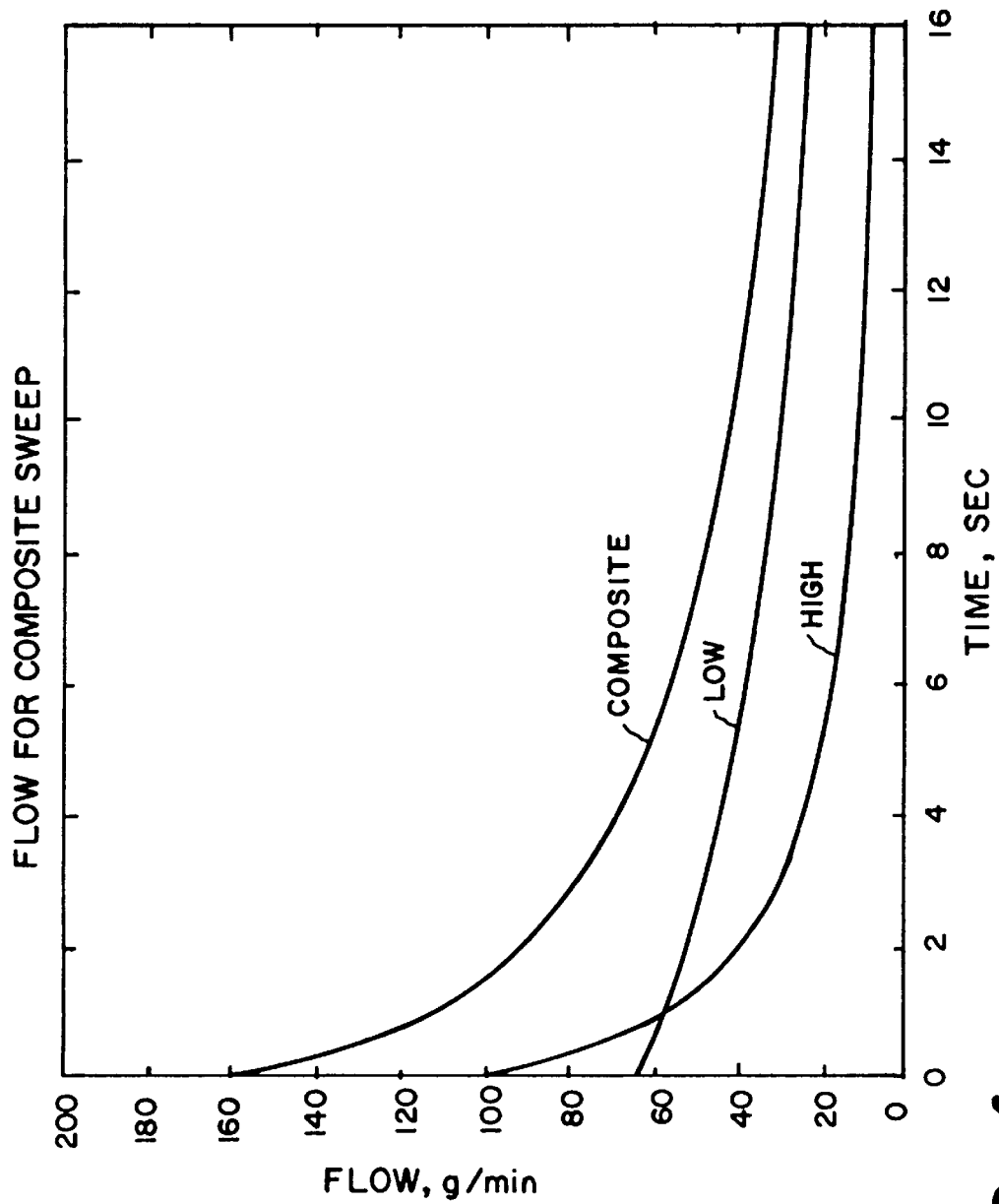

FIG. 4 is a plot of the flow in gallons per minute over the full 16 second interval of the sweeps shown in FIG. 3.

Figure 5:
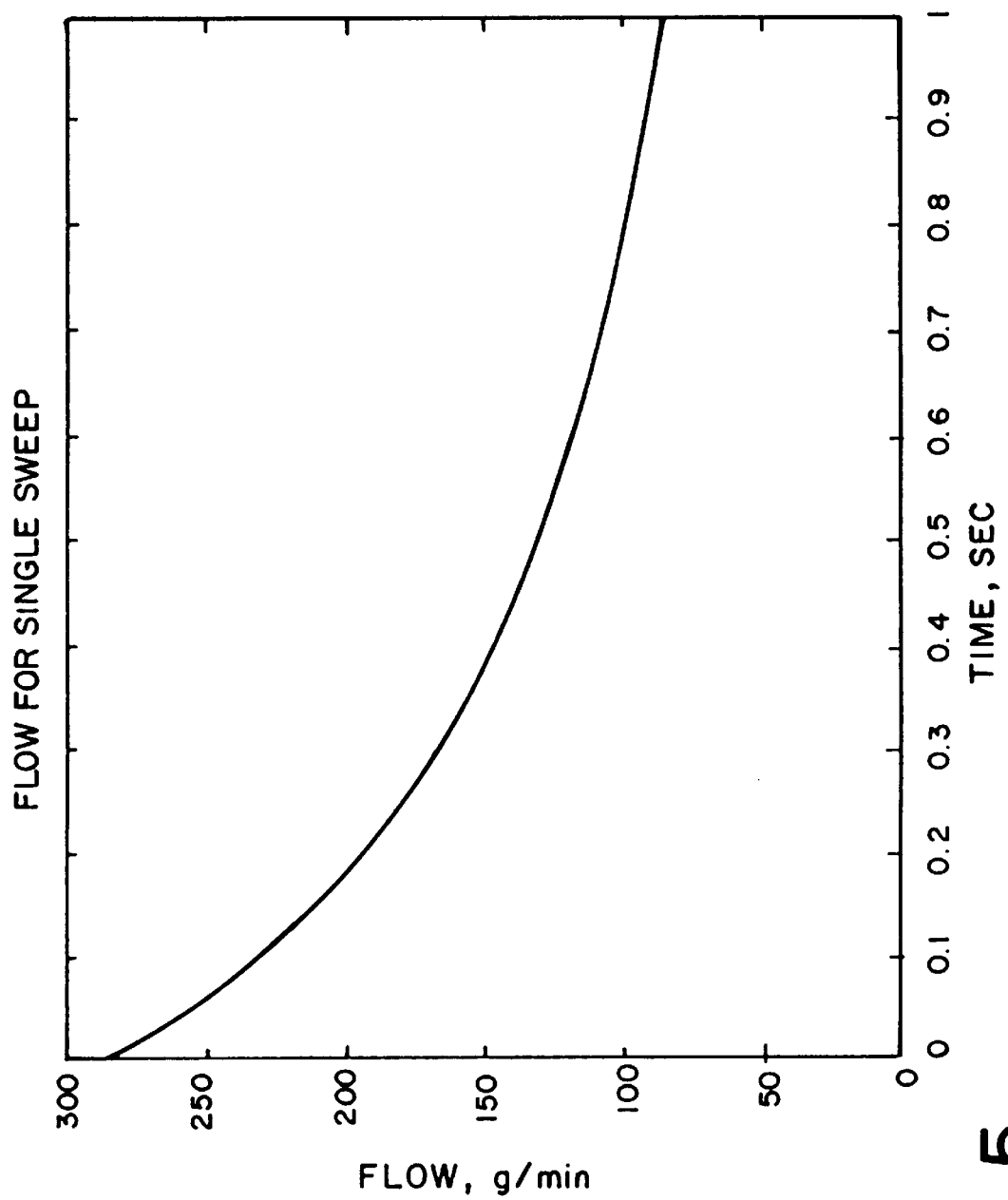

FIG. 5 is a curve showing the flow with respect to time for a single 16-second LFM sweep which extends over the same band as the sweeps illustrated in FIGS. 3 and 4, that is from 5 to 200 Hz. Thus FIG. 5 shows by comparison with FIG. 4 that the peak flow for a single sweep from 5 to 200 Hz in 16 seconds is more than 150% of the peak flow required for a composite sweep providing the same spectral energy which is generated and used in a geophysical exploration system in accordance with the invention. The figures illustrate that a single sweep source would have to be physically larger and heavier in order to handle the flow and the larger strokes which are required to provide the same spectral energy.

Figure 6A:
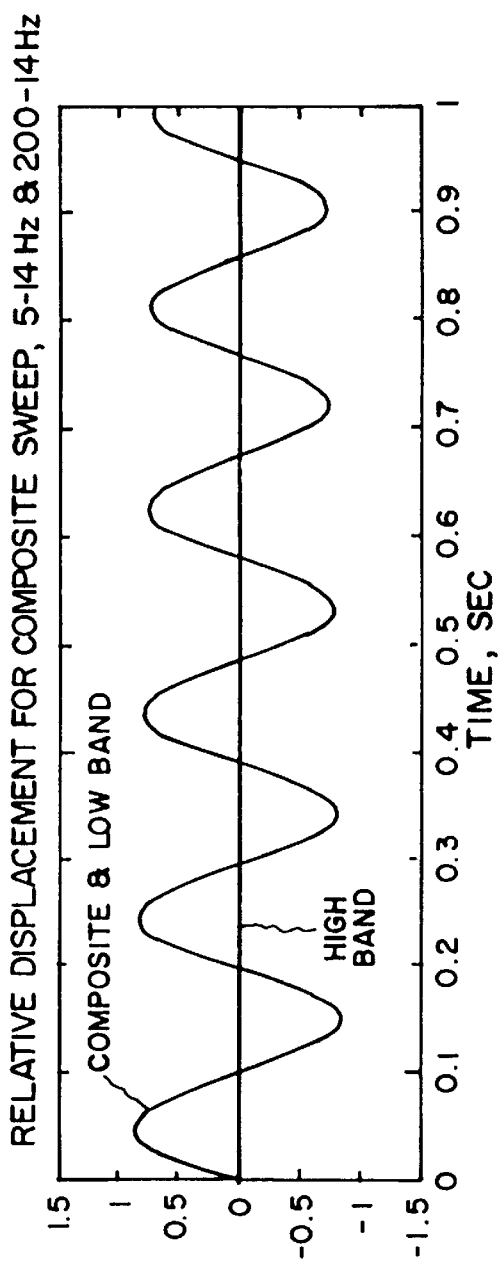

FIGS. 6A & B respectively illustrate curves similar to FIGS. 3 & 4 showing the results when the sweep direction of the high band sweep is reversed. Here the composite sweep is for a 5 to 14 Hz sweep and a 200 to 14 Hz sweep. The peak flow and displacements for this sweep are even better than for the previous composite sweep. (For the displacement plot, the high band amplitude is so low that the composite and low band displacements are nearly identical and overplot each other.)

Figure 6B:
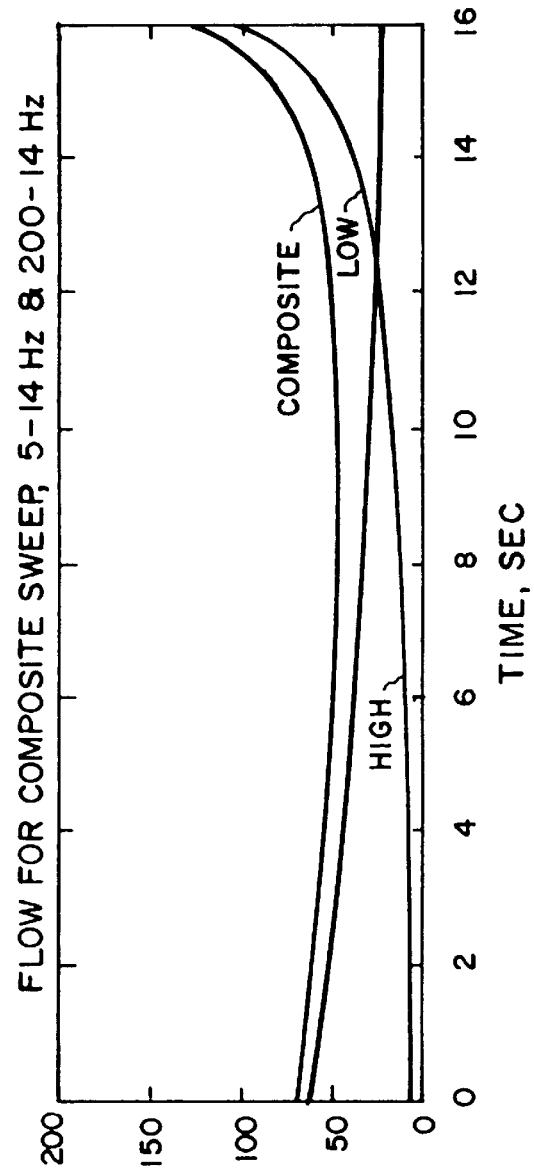

Referring to FIG. 1, there is shown a low band sweep generator 10 and a high band sweep generator 20 which produce the high and low band sweeps, the amplitudes of which are related as the square root of the ratio of the low band sweep bandwidth to the high band sweep bandwidth or the sweep rate of the high band sweep to the sweep rate of the low band sweep. Both sweeps are sinusoidal sweeps and may sweep, for example, in the same upward direction as shown in FIG. 3 or in opposite directions as shown in FIG. 6. Both sweeps are started at the same time by a start sweep signal from a source 12. The sweeps when started continue for a like interval, say 16 seconds as illustrated in FIGS. 3 and 6. Typical sweep intervals from 5 to 20 seconds may be used.

The sweep signals are summed in a summing circuit 14. The output of the summing circuit is both the replica signal which extends from the low to the high end of the band ($f_a$ to $f_b$) and a drive signal for an acoustic source 30. This source may typically be a hydraulic source having a servo valve 32, the output of which is modulated by the $f_a$ to $f_b$ composite sweep to produce variations of flow from a pump 34 through a drive cavity 36 of a vibrator 38. This is a hydraulic vibrator having a radiator plate or piston 40 which, in the case of a marine source, is maintained underwater or, in the case of a land source, is in contact with the surface of the earth. The transmissions are projected through the water into the earth or directly into the earth and are picked up by a receiver 42 of the processing channel 50 of the geophysical exploration system. The receiver may be a hydrophone or geophone array with suitable amplification. A correlation processor 44 correlates the received signal which is reflected from the earth and strata with the replica signal to produce an output which is recorded preferably to provide a seismogram of the earth and strata being surveyed. The processing occurs with the entire composite signal over the interval thereof so as to obtain the benefits of the composite signal simply and directly.

If desired, the source may be compensated for nonlinearities by feedback and other techniques known in the art.

From the foregoing description, it will be apparent that there has been provided an improved geophysical exploration system which incorporates an improved system for producing and transmitting acoustic seismic signals and which utilizes a composite CW sweep of frequencies extending over a plurality of octaves, the system enabling significant reduction in the peak power and flow demand and size of the equipment associated with the seismic source.

What is claimed is:

1. A system for generating acoustic signals over a multioctave frequency band for geophysical exploration which comprises means for generating first and second signals which vary sinusoidally in amplitude and which sweep respectively over lower and higher portions of said frequency band during the same interval of time and have their spectral amplitudes related in proportion to the portion of the bandwidth over which they sweep, means for combining said signals to provide a composite sweep signal, means responsive to said combined signals for generating an acoustic signal corresponding to said composite sweep signal with generally constant spectral level over said frequency band.

2. A system for geophysical exploration which comprises an acoustic source for projecting sinusoidally varying acoustic vibratory signals into an earth strata directly or via water over said strata when said strata is in a marine environment, said source comprising means for generating first and second signals varying sinusoidally in amplitude and which sweep respectively over lower and higher portions of said frequency band during the same interval of time and have their spectral amplitudes related in proportion to the portion of the frequency band over which they sweep, means for combining said signals to provide a composite sweep signal, means responsive to said combined signals for generating an acoustic signal corresponding to such composite sweep signal with generally constant spectral level over said frequency band, means for transmitting said acoustic signal into said strata, means for detecting said acoustic signal after propagation through said strata, and means for processing said detected signal by correlation with said transmitted signal for providing seismograms of sound strata.

3. The system according to claim 1 wherein the frequency of said first and second signals varies linearly over said interval of time and the spectral amplitude of the first signal is reduced with respect to the spectral amplitude of said second signal by the square root of the ratios of the rate which the frequency of said second signal changes to the rate which the frequency of said first signal changes over said interval.

4. The system according to claim 1 wherein said first portion is approximately one octave of said frequency band and said second portion is the remainder of said bandwidth above said approximately 1 octave.

5. The system according to claim 1 wherein one of said first and second signals sweeps in frequency in a upward direction while the other sweeps in a downward direction.

6. The system according to claim 2 wherein the frequency of said first and second signals varies linearly over said interval of time and the spectral amplitude of the first signal is reduced with respect to the spectral amplitude of said second signal by the square root of the ratios of the rate which the frequency of said second signal changes to the rate which the frequency of said first signal changes over said interval.

7. The system according to claim 2 wherein said first portion is approximately one octave of said frequency band and said second portion is the remainder of said bandwidth above said approximately 1 octave.

8. The system according to claim 2 wherein one of said first and second signals sweeps in frequency in a upward direction while the other sweeps in a downward direction.

* * * * *